No. 760,416. PATENTED MAY 24, 1904.
H. BRAMMER.
ARTICULATING DEVICE FOR JOINTS OF MECHANICAL ELEMENTS.
APPLICATION FILED OCT. 1, 1902.
NO MODEL.
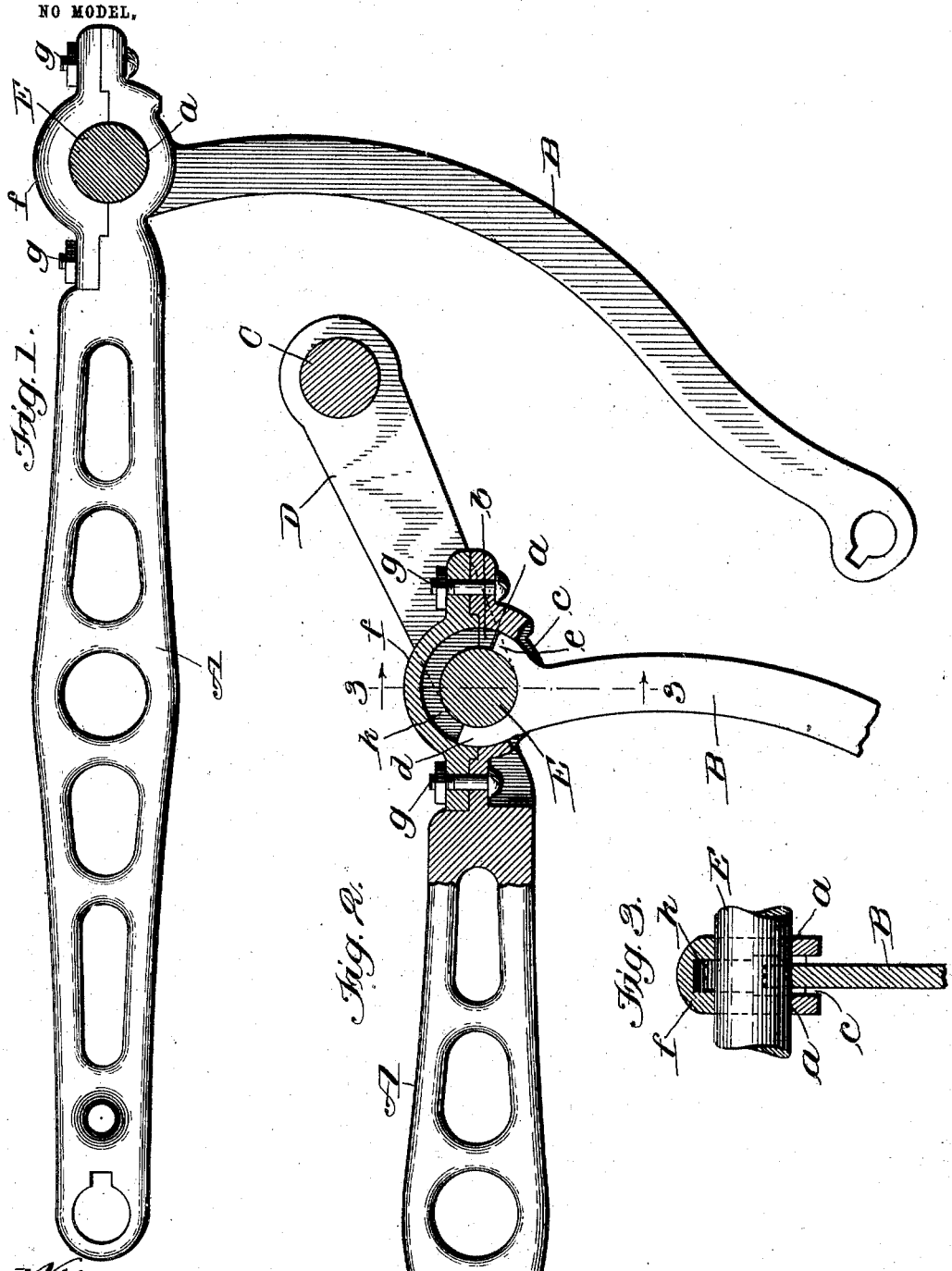
Witnesses:
H. S. Gaither
E. K. Lundy
Inventor:
Henry Brammer
by Frank D. Thomann
Attorney No. 760,416. Patented May 24, 1904.

UNITED STATES PATENT OFFICE.

HENRY BRAMMER, OF ST. LOUIS, MISSOURI.

ARTICULATING DEVICE FOR JOINTS OF MECHANICAL ELEMENTS.

SPECIFICATION forming part of Letters Patent No. 760,416, dated May 24, 1904.

Application filed October 1, 1902. Serial No. 125,510. (No model.)

*To all whom it may concern:*

Be it known that I, HENRY BRAMMER, a citizen of the United States, and a resident of the city of St. Louis and State of Missouri, have invented certain new and useful Improvements in Articulating Devices for Joints of Mechanical Elements, of which the following is a full, clear, and exact description.

My invention relates to the construction of the joints or articulating ends of such mechanical elements as levers and arms, particularly those having a limited movement and found in washing-machines of a certain kind now extensively on the market; and its object is to enable these parts to be easily disjointed and separated for convenience in shipping without disturbing the shaft or crank-pin forming the pivot of the same and to enable the same to be as easily assembled for use. This I accomplish by the means hereinafter fully described, and as particularly pointed out in the claims.

In the drawings, Figure 1 is a side elevation of a connecting-rod and link pivotally connected together in operative engagement with the crank-pin of a crank. Fig. 2 shows a sectional view of the articulating end portions of the same and said crank-pin. Fig. 3 is a transverse section taken on dotted line 3 3, Fig. 2, looking in the direction indicated by the arrows.

In the drawings, A represents a connecting-rod of suitable design; B, a link; C, the drive-shaft; D, a crank, and E the crank-pin thereof. These elements constitute part of a washing-machine, a description of which is unnecessary except to state that the normal relative positions of said link and connecting-rods when the other elements to which they are operatively connected are at rest is substantially at right angles to each other. One end of the connecting-rod is connected to the crank-pin, and the bearings to accomplish this union comprise an open bearing $a$, which is made by flattening the end of said rod, increasing the depth of said flattened portion mediate its ends, and making the transverse semicircular seat therein for pillowing the journal of said crank-pin E therein. The bearing of the connecting-rod is provided with a circumferential groove $b$ between its ends, and the lower segmental wall of said groove is cut away to provide an opening $c$, up through which the upper end of the link extends. The upper end of the link is provided with curved bifurcations $d$ and $e$, the combined reach or spread of which is such that the inner edges thereof conform to a semicircle corresponding to the circumference of the journal of the crank-pin and their outer edges to the circumference of the groove $b$. Bifurcation $e$ is preferably shorter than $d$; but they both can, by moving link B into a position where it will be at a more acute angle to rod A than as shown in the drawings, be easily inserted up through opening $c$, which latter is sufficiently elongated circumferentially to accommodate the limited oscillatory movement it is desired link B to have. When the bifurcations on the upper end of the link are inserted up through opening $c$ of bearings $a$ and then seated in the groove $b$, which they are intended to occupy and move in, they are locked in place by the act of seating said crank-pin in its bearings and securing a bearing-cap $f$ over said crank-pin by bolts $g$ $g$, passing through the flattened portions of said rod A at either side of the bearings, as shown. The inner semicircumferential bearing-surface of the cap is between its ends also provided with a groove $k$, corresponding in extent and dimension to groove $b$, of which it is a continuation, and together therewith forms a continuous circumferential groove in the bearing of the crank-pin. In operation when it is desired to knock down or separate these parts all that is necessary is to remove cap $f$, lift the crank-pin from its bearings, and then separate the link from the connecting-rod by moving them into an acute-angular position to each other, so as to permit the bifurcations to be passed down through opening $c$ of the bearings $a$.

I do not wish to be understood as confining my invention to rods and links, as it is obvious it can be used in connection with levers and arms and other mechanical elements used either in conjunction with a crank or with a pivoted bolt having the equivalent relation thereto as the crank-pin has to the rod and link hereinbefore described.

What I claim as new is—

1. Articulating devices for knee-joints comprising two pivotally-connected mechanical members one end of one of which has a bearing provided between its ends with a central annular chamber that has a lateral opening into the same, and the second member of which has the end articulating with said first member provided with curved bifurcations removably inserted in said annular chamber, in combination with a pivotal device journaled in said bearings.

2. Articulating devices comprising two pivotally-connected elongated mechanical members, one end of one of which is flattened and provided with a transverse bearing and a removable cap therefor, between the ends of the bearing-surfaces of which a central annular chamber is formed, that has a lateral opening into the same, and the second member of which has the end articulating with said first member provided with curved bifurcations, removably inserted in said annular chamber, in combination with a pivotal device journaled in said bearings.

3. Articulating devices for knee-joints comprising two pivotally-connected mechanical members, one end of one of which has a bearing provided between its ends with a central annular chamber that has a lateral opening into the same, and the second member of which has the end articulating with said first member provided with curved bifurcations, of semicircular extent, removably inserted in said central annular chamber, in combination with a pivotal device journaled in said bearings.

4. Articulating devices for knee-joints comprising two pivotally-connected mechanical members, one end of one of which has a bearing provided between its ends with a central annular chamber that has a lateral opening into the same, and the second member of which has the end articulating with said first member provided with curved bifurcations one of which is shorter than the other and together are of semicircular extent removably inserted in said central annular chamber, in combination with a pivotal device journaled in said bearings.

5. Articulating devices comprising two pivotally-connected elongated mechanical members, one end of one of which is flattened and provided with a transverse bearing, and a removable cap therefor, between the ends of the bearing-surfaces of which a central annular chamber is formed that has a lateral opening into the same, and the second member of which has the end articulating with said first member provided with curved bifurcations of semicircular reach or extent removably inserted in said central annular chamber, in combination with a pivotal device journaled in said bearings.

6. Articulating devices comprising two pivotally-connected elongated mechanical members, one end of one of which is flattened and provided with a transverse bearing, and a removable cap therefor, between the ends of the bearing-surfaces of which a central annular chamber is formed that has a lateral opening into the same, and the second member of which has the end articulating with said first member provided with curved bifurcations one of which is shorter than the other and together they are of semicircular extent removably inserted in said central annular chamber, in combination with a pivotal device journaled in said bearings.

HENRY BRAMMER.

Witnesses:
T. J. FLANAGAN,
JAMES P. LYNCH.